United States Patent [19]

Maclay et al.

[11] Patent Number: 4,458,278
[45] Date of Patent: Jul. 3, 1984

[54] DISK-CENTERING MECHANISM FOR USE WITH A HIGH-DENSITY FLEXIBLE DISK

[75] Inventors: William R. Maclay, Los Gratos; Laureen V. Merritt, Los Altos, both of Calif.

[73] Assignee: Datacopy Corporation, Mountainview, Calif.

[21] Appl. No.: 373,070

[22] Filed: Apr. 29, 1982

[51] Int. Cl.³ .................... G11B 17/02; G11B 25/04
[52] U.S. Cl. ......................................... 360/99; 360/97
[58] Field of Search ................................. 360/97–99, 360/133, 135, 86; 369/261, 270; 346/137; 358/128

[56] References Cited

U.S. PATENT DOCUMENTS

| | | | |
|---|---|---|---|
| 3,940,793 | 2/1976 | Bleiman | 360/99 |
| 4,171,531 | 10/1979 | Grapes et al. | 360/97 X |
| 4,216,510 | 8/1980 | Manzke et al. | 360/97 X |
| 4,358,803 | 11/1982 | Van Der Giessen | 360/97 X |
| 4,403,319 | 9/1983 | Adamek | 360/99 X |

*Primary Examiner*—John H. Wolff
*Attorney, Agent, or Firm*—Owen L. Lamb

[57] ABSTRACT

An apparatus for the very precise centering of a flexible recording disk (2) onto a disk-drive spindle (8), for clamping it firmly for spinning, and for the easy removal thereof. Disk (2) is provided with a reinforced center hole (4) so that it can be manufactured to a tight tolerance. Spindle (8) is provided with a precision-alignment cylinder (12) over which the disk must slide in order to rest on a spindle seat (6). Once disk (2) is resting on spindle seat (6), it is clamped there by a self-aligning, rotatable spindle cap (24), which is brought down on top of the disk. The disk is centered for sliding along the alignment cylinder through the action of a conical surface on cone (14). The cone (14) in its entirety may be part of spindle (8), or alternatively, in order to facilitate insertion and removal of the disk, part of the cone may be integral to the clamping-spindle cap (24), or be a retractable plug. Those parts which are movable are moved out of the way of the disk as it is slid in and out of the mechanism. A skid plate is provided to deflect the disk away from spindle (8) during insertion and removal and to keep it parallel to the spindle seat. This skid plate is moved out of the way after spindle cap (24) has clamped the disk to the spindle. The disk is centered by conical surface (14) as clamping-spindle cap (24) moves downward to drive the disk towards its seat (6) on the spindle (8). The clamping surfaces (6, 26) are kept parallel so that the final motion of the disk over the alignment cylinder (12) proceeds without binding. The skid plate is moved down out of the way so that spinning may proceed. Removal of the disk is accomplished in the reverse order. The rise of the disk skid plate upward serves to lift the disk off spindle (8) so that the disk may be pulled straight out.

17 Claims, 9 Drawing Figures

DISK-CENTERING MECHANISM FOR USE WITH A HIGH-DENSITY FLEXIBLE DISK

BACKGROUND OF THE INVENTION

1. Field of the Invention

The invention relates to disk-drive mechanisms, and more particularly to a method and apparatus for engaging a flexible disk with a rotatable-disk spindle.

2. Description of the Prior Art

In copending patent application Ser. No. 06/265,411 of Armin Miller, et al, filed May 19, 1981, for "Electronic Camera with Means for Recording Optical Images," there is described a high-resolution electronic camera with storage capability. The image at the focal plane of a lens is scanned in one direction by a linear photodiode array, and in the orthogonal direction, by relative motion of the linear array with respect to the lens. This relative motion is translated into comparable relative motion of a recording head, with respect to a small flexible recording disk, by mechanical linkage so that the picture element (pixel) information is recorded for later use simultaneously with its generation.

In order to make an electronic camera small enough in size so that it is portable and easily hand-held, the disk recording mechanism, which is part of the camera body, must be made smaller than presently available state-of-the-art flexible disk recording mechanisms. Futhermore, a high resolution electronic camera as described will generate much more data than presently-available flexible disk and drive mechanisms can handle. Thus, in addition to requiring a smaller disk, such a camera requires much greater bit-packing densities, and thus greater track densities, than has been possible in the past.

The track densities that can be achieved on a flexible disk is of interest to the general computer industry as well. The disks are quite inexpensive, easily mailed, and take little storage space. However, the head/disk interface must be protected from dirt, grease, and other contamination. Even the material found on clean human skin can foul the head and abrade the disk. Consequently, disk drives are designed so that the human operator is limited to inserting the disk into a slot on the side of the drive and closing the hatch. The process of closing the hatch operates a mechanism which centers and clamps the disk for spinning. It is this centering and clamping mechanism which limits the track densities that can presently be achieved. Thus, improvements to this mechanism which allow storing more data at less cost would find wide usage.

The way in which the centering and clamping mechanism limits the achievable track density is as follows. An empty disk when first recorded on will have nice, uniformly spaced, concentric circular tracks all coaxial to the center rotation of the disk drive's spindle. The issue is how well that disk centering can be reproduced the second time the disk is placed in the drive. Any offset between the first center of rotation and the center of rotation achieved the second time will cause the first recorded tracks to be eccentric in their second rotation; they will move back and forth underneath the head and thus give reduced playback signal levels. The tighter the control that can be achieved, then, on repeated centering operations, the more tracks can be placed on the disk.

The disk will usually have a circular center hole, while the spindle will have a seat for the disk to rest on and a central pin or plug passing through the disk's center hole to hold it in alignment. If the disk center hole has the same diameter as the plug, the two must be perfectly aligned for the one to slide over the other. The usual solution to this classic dilemma is to make the hole slightly larger than the plug. This final-fit situation is usually overshadowed, however, by other considerations. Flexible disks usually come in envelopes which are inserted between guide rails as they are placed into the disk drive. Each of these interfaces has its manufacturing tolerances which are most easily accommodated by making the disk center hole very large indeed. In order to reduce the hole size requirements and the resulting disk alignment error possibilities, the presently available state-of-art disk drives use a spindle plug that expands after the disk has been placed over it. There are several ways of doing such, from rubber plugs that expand radially upon being compressed axially to a set of cam-actuated fingers. While such techniques are adequate and sufficiently inexpensive for present state-of-the-art low-density flexible disk drives, they are inadequate at the track densities now being considered.

It is therefore a primary object of the present invention to provide a new and unique mechanism that will precisely center a flexible disk on a spindle and to clamp it for rotation, thereby achieving greater storage capacity at a lower overall cost.

It is a further object of the present invention to clamp the disk between parallel plates so there is minimal possibility that the mechanism will jam.

It is a yet further object of the invention to minimize the required motion of the clamping plates, this minimal motion being related to the ease in which disks are placed into and removed from the disk drive.

SUMMARY OF THE INVENTION

Briefly, the present invention is concerned with a method and apparatus for the very precise centering of a flexible recording disk onto a disk drive spindle, for clamping it firmly for spinning, and for the easy removal thereof. The disk is provided with a reinforced center hole so that it can be manufactured to a tight tolerance. The spindle is provided with a precision alignment cylinder over which the disk must slide in order to rest on the spindle seat. Once the disk is resting on the spindle seat, it is clamped there by a self-aligning, rotatable spindle cap which is brought down on top of the disk.

In accordance with an aspect of the invention, the disk is centered for sliding along the alignment cylinder through the use of a cone. The cone in its entirety may be part of the spindle. Alternately, in order to facilitate insertion and removal of the disk, part of the cone may be integral to the clamping spindle cap or be a separately movable plug. Those parts which are movable are moved out of the way of the disk as it is slid in and out of the mechanism.

In accordance with a further aspect of the invention, a skid plate is provided to deflect the disk away from the unmovable part of the spindle and to keep it parallel to the spindle seat. This skid plate is moved out of the way after the spindle cap moves to clamp the disk to the spindle.

In accordance with a method of use, a disk is placed by the user into a slot in the front face of the disk drive and pushed forward. The disk motion is guided by U-channels as it is pushed all the way in. The skid plate causes the disk to slide over the fixed part of the spindle. The user moves a lever provided on the face of the drive to engage the disk to the spindle.

The disk is centered by cones fixed and movable as the clamping spindle cap moves to drive the disk towards its seat on the spindle. The clamping surfaces are kept parallel so that the final motion of the disk over the alignment cylinder proceeds without binding. The skid plate is finally moved out of the way so that spinning may proceed. Removal of the disk is initiated by the user by moving the control lever in the opposite direction, and the above-described sequence of events occurs in reverse order. The rise of the disk skid plate serves to lift the disk off the spindle so that the user need only pull the disk straight out.

The invention has the advantage that because the disk is moved by parallel motion onto the spindle and kept parallel to the spindle seat, a very accurate disk-centering arrangement is possible.

The invention has the further advantage that because the required motion of the clamping plates has been minimized, a very compact disk-centering mechanism is achieved, and it is easy to insert the disks into and remove the disks from the disk drive.

The foregoing and other objects, features, and advantages of the invention will be apparent from the following detailed description of the preferred embodiments of the invention as illustrated in the accompanying drawings.

DESCRIPTION

Figure 1:
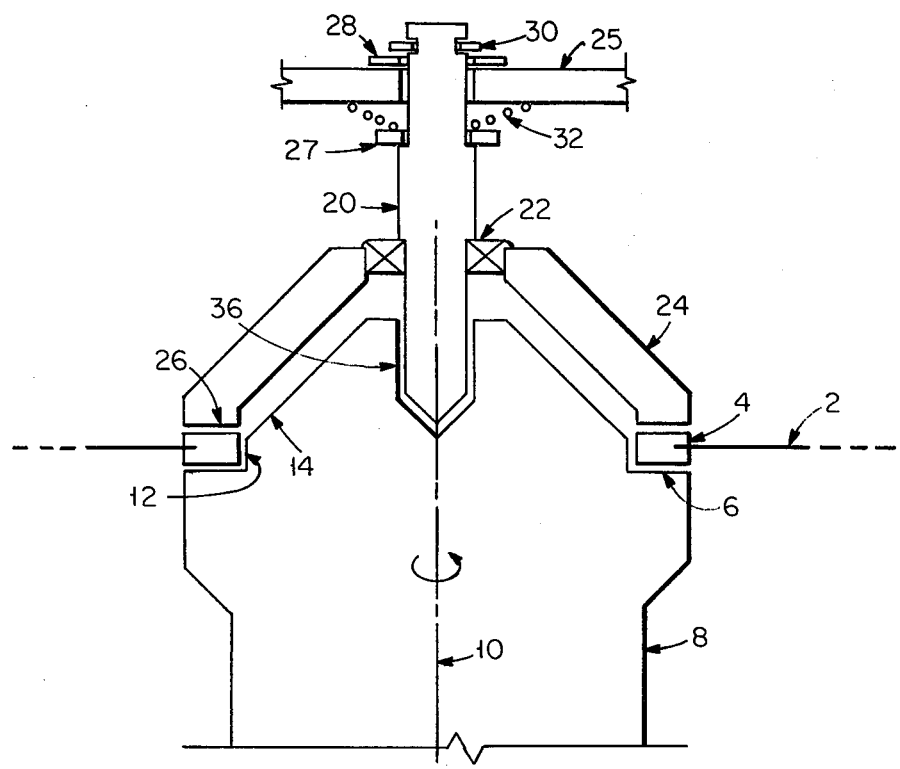
FIG. 1 is a cross-section of a spindle with an alignment cylinder topped by a centering cone, along with a spindle cap mounted on a self-centering bearing structure.

Referring now to FIG. 1, a flexible disk (2) provided with reinforcing ring (4) is shown resting on seat (6) of spindle (8). The disk (2) is aligned to the center of rotation (10) of the spindle (8) by the alignment cylinder surface (12). The accuracy of the location of the disk (2) with respect to the center of rotation (10) is only a function of the accuracy of the cylinder surface (12) and of the inner diameter of the reinforcing ring (4), both of which can be held to less than a thousandth of an inch. The spindle (8) is equipped with a cone (14) which serves to center the disk (2) as the disk (2) is initially placed on the spindle (8). An alignment hole (36) is provided in the tip of the cone (14). The cone (14) needs to extend towards the center of rotation (10) only far enough so as to be able to catch ring (4) as the disk (2) is initially placed in the disk drive.

Shaft (20) has a conical tip (34) and is mounted to top plate (25) through the use of washers (26, 28), snap-ring (30), and a conical spring (32), and is equipped with a bearing (22), which in turn holds a spindle cap (24). Shaft (20) is movable by a mechanism (not shown) connected to plate (25), towards and away from spindle (8) in such a fashion that the clamping surface (26) remains parallel to the seating surface (6) as clamping is being accomplished. Keeping the two surfaces parallel results in the most uniform distribution of the clamping pressure and also makes possible easy rotation of the engaged clamping-surface/seating-surface (6) assembly.

Shaft (20) is able to align itself for rotation with spindle (8) because its mounting to plate (25) through use of washers (26, 28), snap-ring (30), and conical spring (32) allows it to translate in a plane parallel to seat (6) while remaining perpendicular to seat (6). Proper alignment is further assured by the conical tip (34) which is forced into the alignment hole (36) in the tip of the cone (14) as the shaft (20) is moved towards the spindle (8) due to motion of plate (25).

It is presently apparent that there are in fact two alignment operations that happen as a disk (2) is placed in the above-described mechanism. The disk reinforcing ring (4) and its clamp (24) must both align separately to spindle (8). While these three pieces (4, 8, and 24) must remain distinct, there is no requirement that the two conical surfaces (14, 34) remain distinct and separate.

Figure 2:
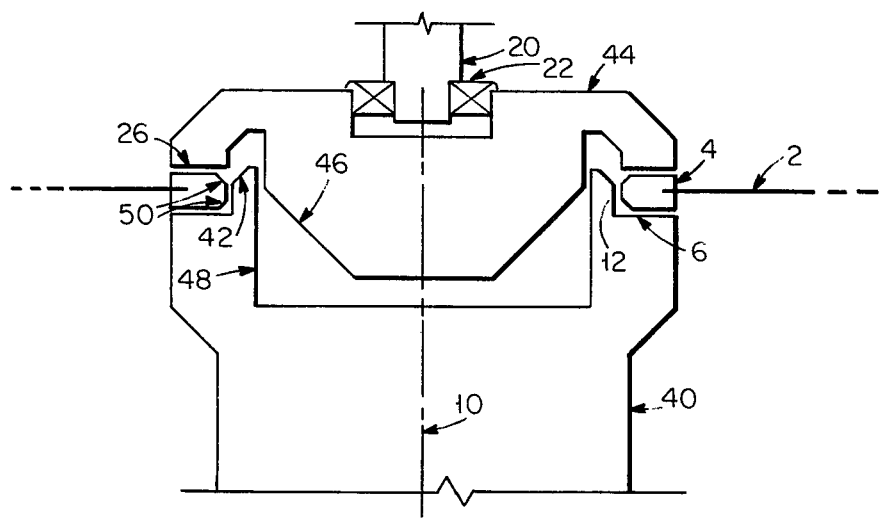
FIG. 2 is a cross-section of a spindle where the majority of the centering cone is part of the spindle cap.

Referring now to FIG. 2, a disk (2) provided with a reinforcing ring (4) is shown resting on seat (6) of spindle (40). The disk (2) is aligned to the center of rotation (10) of the spindle (40) by the alignment cylinder surface (12). Spindle (40) is equipped with conical surface (42) which rises above the cylinder surface (12) for a distance yet to be described. Shaft (20) is equipped with bearing (22), which in turn holds spindle cap (44). Cap (44) has a conical surface (46) which serves to center both the shaft (20) and the ring (4) with respect to spindle (40), as shaft (20) is driven towards spindle (40). As ring (4) slides along conical surface (46), it will experience a discontinuity between the ending of conical surface (46) and the start of conical surface (42). The discontinuity exits because the diameter of receiving hole (48) in spindle (40) must be somewhat larger than the maximum diameter presented by conical surface (46), and because the lip of alignment hole (48), as formed with respect to conical surface (42), cannot be made perfectly sharp. For this reason, a chamfer (50) is placed on ring (4). The chamfer (50) is made long enough so that the ring (4) can slide over the described discontinuity. The chamfer (50) is placed on both sides of ring (4) so that both surfaces of disk (2) may be utilized.

Thus it has been shown that alignment cone (14) may be split into two cooperating conical surfaces (42, 46) with a chamfer (50) on ring (4) bridging the discontinuity in between. Which surfaces should predominate is somewhat arbitrary. Surface (46) is nonexistent in the embodiment shown in FIG. 1 as far as contact with ring (4) is concerned. Making surface (42) very small, or nonexistent, runs the risk of making the wall between the cylinder surface (12) and the alignment hole (48) so thin that it is easily damaged. The reason for making surface (42) fairly small is that the amount of travel of ring (4) is thereby minimized. The ring (4) in FIG. 1 must move approximately as far as shaft (20), while the ring (4) in FIG. 2 needs travel only somewhat more than its own thickness.

The mechanisms described in FIGS. 1 and 2 rely on surface (6) being parallel to surface (26) as determined by the correct alignment of the plate (25) to the spindle's center of rotation (10). The accuracies of alignment that can be reasonably achieved are satisfactory for sliding ring (4) over the several conical surfaces that have been described. Since shaft (20) has a self-aligning connection to plate (25), it is assured that surfaces (6) and (26) will wind up in alignment once they are pressed tightly enough together. However, there is a critical step in the aligning and clamping operation that must be addressed. The ring (4) must be parallel to seat (6) as it moves along cylindrical surface (12). If this is not accomplished, the ring (4) will appear as an ellipse to the cylindrical surface (12). That is, one diameter of the ring (4) will appear shorter than the orthogonal diameter and, if this shortening is sufficient, the ring (4) will bind on the cylindrical surface (12). Knowing the range of the tilts possible between the ring (4) and the cylinder (12), the inner diameter of the ring (4) could be made large enough so the binding cannot occur. But doing so would defeat one of the objects of the present invention, that is, to provide a mechanism that will precisely center a flexible disk on a spindle and to clamp it for rotation.

Figure 3:
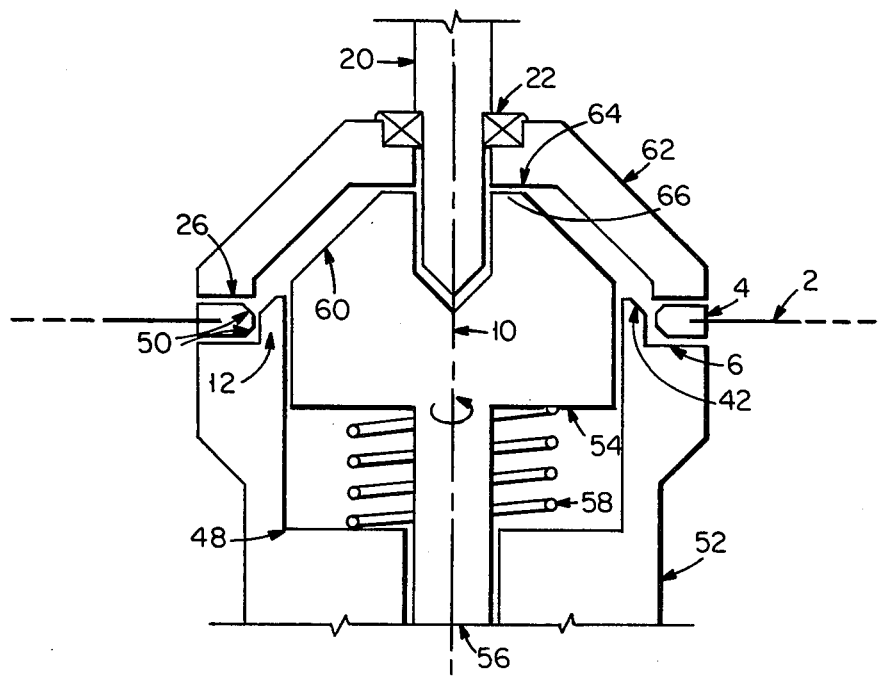
FIG. 3 is a cross-section of a spindle where the majority of the centering cone is on a coaxial plug.

Referring now to FIG. 3, disk (2) is provided with a reinforcing ring (4) and is shown resting on the seat (6) of spindle (52). The disk (2) is aligned to the center of rotation (10) of spindle (52) by the alignment cylinder surface (12). Spindle (52) is equipped with a conical surface (42) which is useful in guiding ring (4) into place. Spindle (52) is also equipped with plug (54) which resides in receiving hole (48). The position of plug (54) is controlled by shaft (56) which is coaxial with spindle (52). Spring (58) serves to keep the shaft (56) under tension at all times. Plug (54) is equipped with conical surface (60) which, when plug (54) is correctly positioned, serves as an extension of conical surface (42). Ring (4) will experience a discontinuity as it slides from surface (60) to surface (42), so its internal edges have a chamfer (50) to carry it over this gap.

Shaft (20) is equipped with bearing (22), which in turn holds spindle cap (62). Shaft (20) is movable by a mechanism (not shown) towards and away from spindle (52), while remaining nominally coaxial to it. Spindle cap (62) is equipped with a first clamping surface (26), which serves to force ring (4) against seat (6) as shaft (20) is moved towards spindle (52). Spindle cap (62) is also equipped with a second surface (64) that is parallel to first surface (26). This second surface (64) is located close to and around shaft (20) where it does not interfere with the conical surfaces used to center the disk on the spindle. Plug (54) is provided with a corresponding parallel surface (66).

The nature of the parallel surfaces (6, 26, 64, and 66) needs to be discussed. Spindle (52) and plug (54) on its shaft (56) are made on a lathe where it is fairly easy to cut at high accuracy a surface perpendicular to the axis of rotation. Thus, surfaces (6) and (66) are quite likely parallel when the plug (54) is placed in the spindle (52). Similarly, surface (64) can easily be machined parallel to surface (26). But the structures that hold shaft (20) supposedly parallel to spindle (52) inevitably involve multiple pieces with individual manufacturing tolerances, so that in an assembled mechanism, surface (26) will rarely be parallel to surface (6). Surfaces (64) and (66) are used in the following fashion to assure the parallelness of surfaces (6) and (26) before ring (4) is forced over cylindrical surface (12).

Assume that the disk (2) is about to be inserted into the disk drive in which spindle (52) and associated parts are located. The spindle cap (62) is in a withdrawn up position. Plug (54) is withdrawn into receiving hole (48) to below the conical surface (42) so that, as the disk (2) is inserted into the drive, ring (4) need only clear conical surface (42) in the process. Plug (54) is then forced towards spindle cap (62) by a mechanisms (described subsequently), centering disk (2) in the process, until surface (66) on the plug contacts surface (64) on the spindle cap. Shaft (20) is then forced downward towards spindle (52) causing plug (54) to regress back into receiving hole (48). The pressured contact between surfaces (64) and (66) align surface (26) parallel to surface (6) so that as ring (4) passes onto cylindrical surface (12), the axes of the ring (4) and cylindrical surface (12) are maintained parallel. Thus the possibilities for the ring (4) binding to the cylindrical surface (12) are minimized.

When it is time to remove the disk (2) from the spindle (52), it must be lifted up off the spindle (52) just as carefully as it was placed thereon. An additional mechanism, described below, is utilized to accomplish this.

Figure 4:
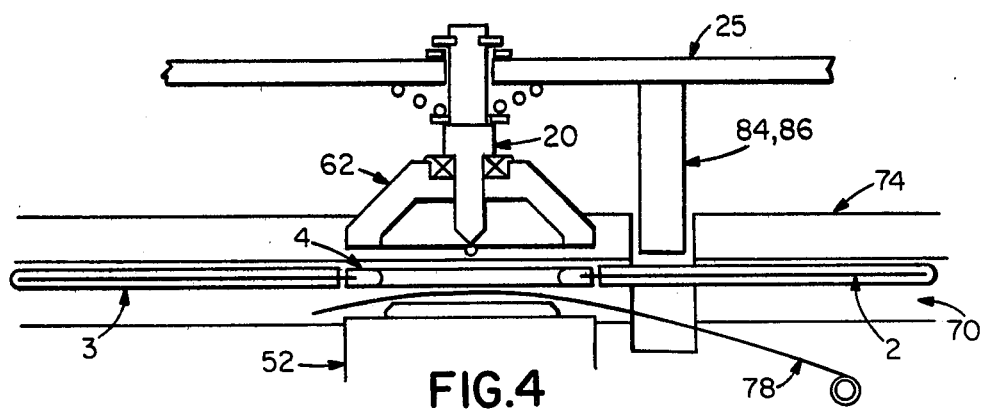
FIG. 4 is a cross-section of a spindle and cap showing the location, and means for operating, a leaf spring skid plate.
Figure 5:
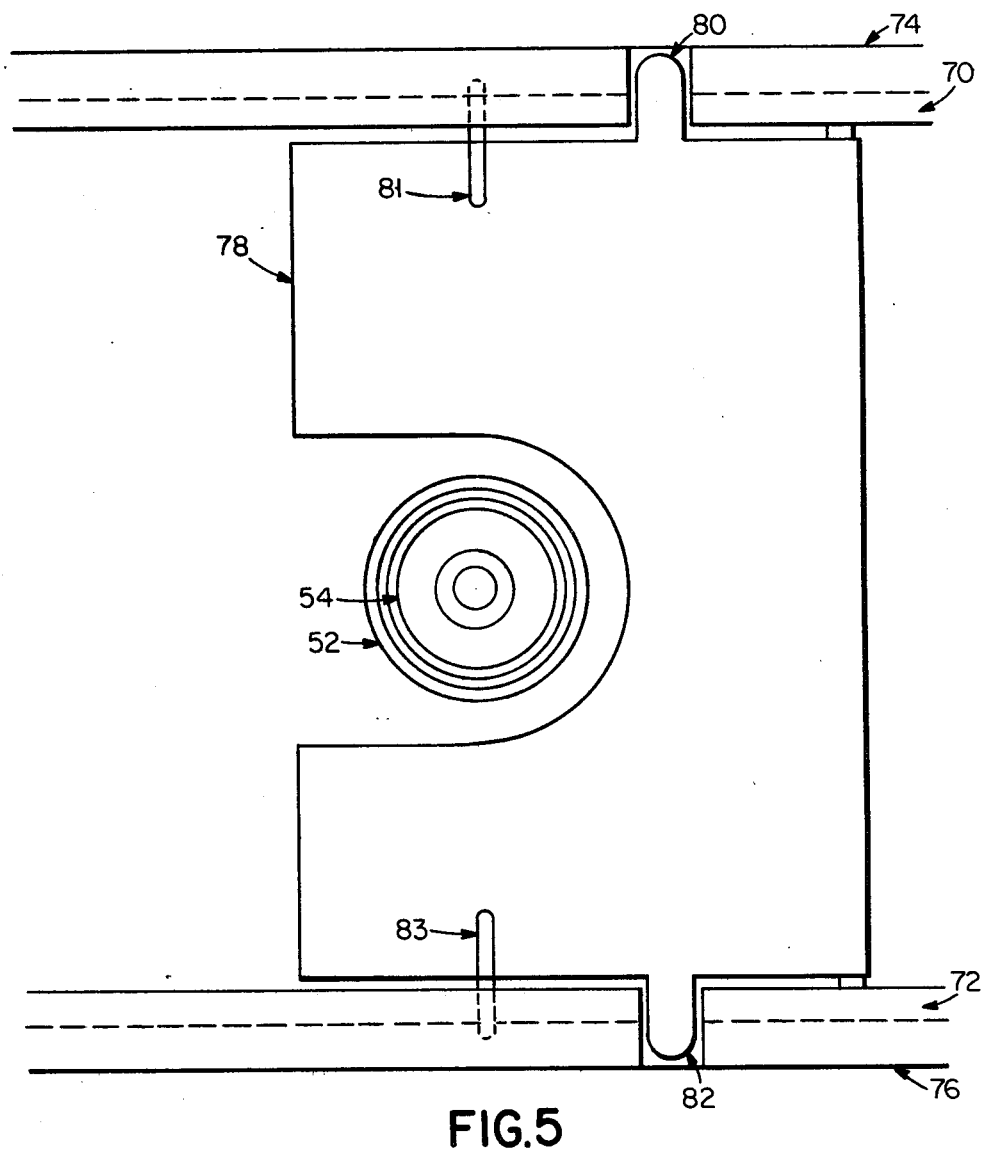
FIG. 5 is a top view of the spindle and skid plate shown in FIG. 4.

Refer now to FIG. 4 and FIG. 5. A disk (2) is housed in an envelope (3), in accordance with current practice in flexible disk art. As the disk (2) in envelope (3) is inserted into the disk drive, it is actually slid into channels (70, 72) cut into side walls (74, 76, FIG. 5). Leaf spring (78) spans the distance between side walls (74, 76, FIG. 5) and serves to force the disk towards the top of channels (70, 72). This prevents the envelope (3), or the reinforcing center ring (4), from hitting the top of spindle (52) and its center plug (54). Plate (25, FIG. 4) holds shaft (20) and spindle cap (62) over the center of spindle (52) and is moved by a mechanism (described subsequently) such that the spindle cap (62) clamps ring (4) against spindle (52). Leaf spring (78) is shaped so it only presses against envelope (3) and does not interfere with the described clamping action. Leaf spring (78) is equipped with tabs (80, 82, FIG. 5) that stick out into notches in the side walls (74, 76) so that the tabs are visible from plate (25), even when the disk (2) and its envelope (3) are in place. Plate (25) is equipped with posts (84, 86, FIG. 4), which push down on tabs (80, 82) and thereby force leaf spring (78) down and out of the way after the described clamping action has occurred. Leaf spring (78) also serves to lift the disk (2), its envelope (3), and ring (4) off the spindle (52) as plate (25) rises to unclamp the ring (4). Pins (81, 83, FIG. 5), placed in side walls (74, 76) just above channels (70, 72), serve to limit the upward travel of leaf spring (78) when disk (2) and its envelope (3) are removed from the disk drive.

Figure 6:
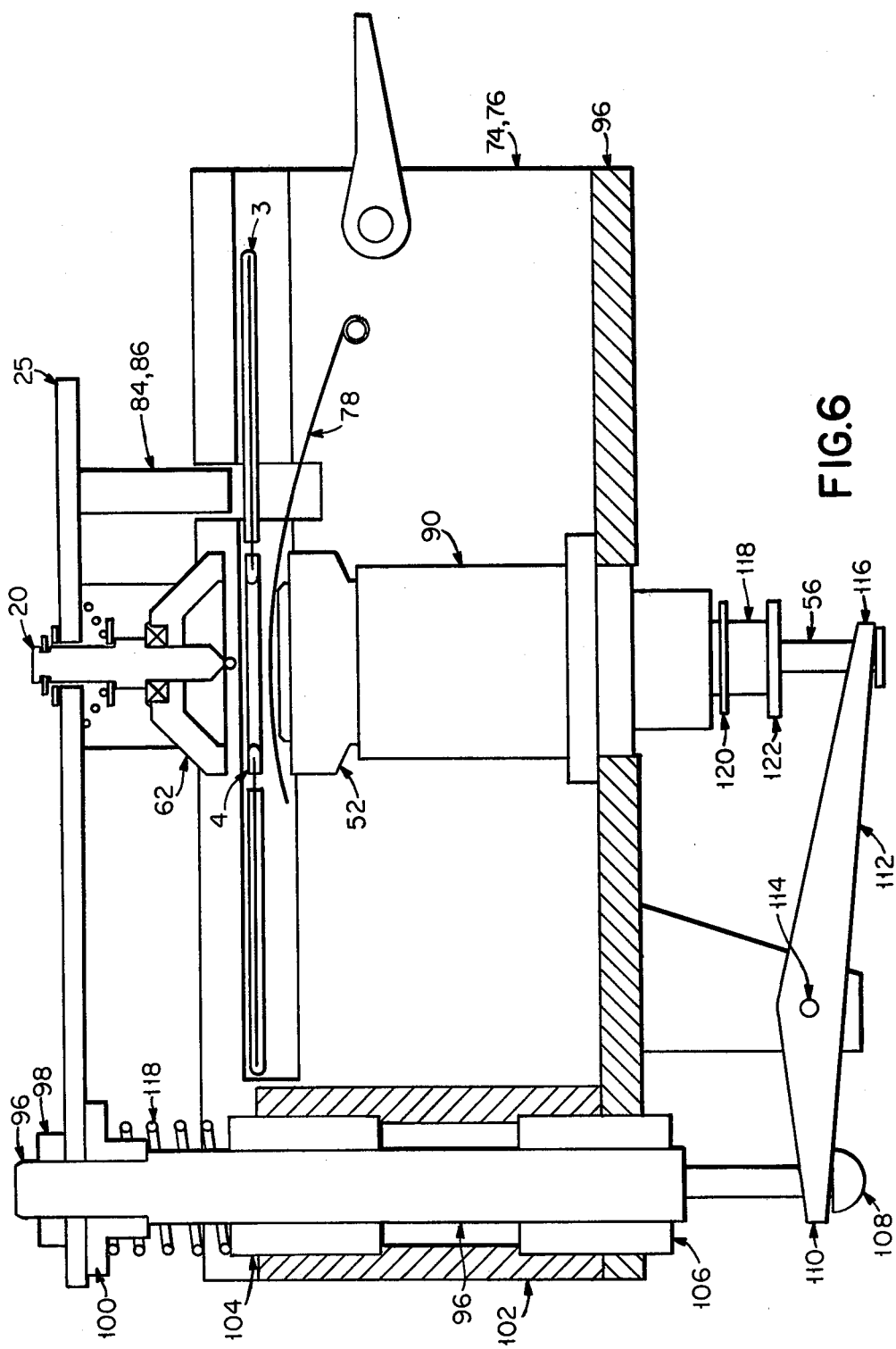
FIG. 6 is a partial cross-section showing a mechanism for controlling the relative motion of the spindle cap and the spindle plug.

Referring now to FIG. 6, spindle-bearing mount (90) holds spindle (52) to base plate (92). Side walls (74, 76) also rest on base plate (92). Plate (25), with posts (84, 86) and spindle cap (62) assembled thereon, is connected to one end (94) of relay rod (96) through use of a nut (98) and a collar (100). The relay rod (96) is held onto base plate (92) through bearing mount (102) and linear bushings (104, 106). The other end (108) of the relay rod (96) is connected to the first end (110) of lever (112) which pivots on fulcrum pin (114). The second end (116) of lever (112) is connected to the bottom end of plug shaft (56). The connections to the lever (112) are of the pinin-slot type so that neither the relay rod (96) nor the plug shaft (56) receive side loads as the lever (112) rotates around the fulcrum pin (114). The linkage from the plug shaft (56) to the relay rod (96) is kept taut by the plug spring (58) shown in FIG. 3. The assemblage is kept in the open position through action of spring (118). Plug shaft (56) is coaxial to spindle shaft (118) whose bottom end is equipped with flanges (120, 122). These flanges (120, 122) serve as belt guides so that the spindle shaft (118), the spindle (52), and other associated parts may be belt-driven from a motor (not shown).

The assemblage is moved to the closed position by applying force to the plate (25), or relay rod (96), in a way to counter the force of spring (118). As plate (25) moves to place spindle cap (62) onto spindle (52), this action is transferred via relay rod (96) and lever (112) to plug shaft (56) which, due to the designed mechanical advantage of lever (112), allows plug (54) with its centering cone (60) to move rapidly upward towards the spindle cap (62). As a result, the spindle cap (62) is aligned by plug (54), as previously described, before ring (4) is slid over the cylindrical alignment surface (12) of spindle (52).

Figure 7:
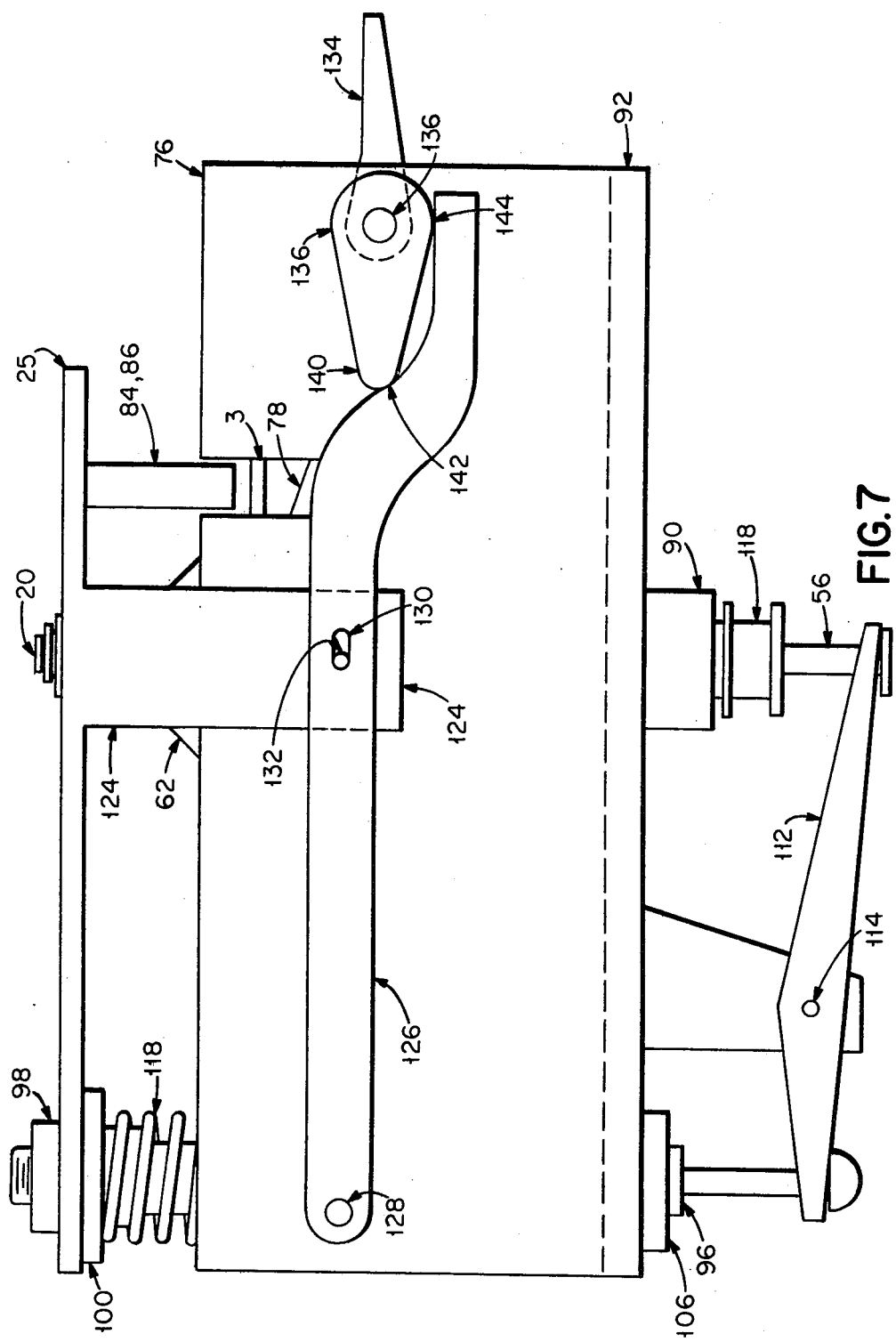
FIG. 7 shows one way to connect an operator's control lever to the mechanism of FIG. 5.

Referring now to FIG. 7, plate (25) has a side tabe (124), which extends towards base plate (92) on the outside of side wall (76). Lever arm (126) pivots on a pin (128), which is fixed to side wall (76). Lever arm (126) couples to side tab (124) through a slotted hole (130) in lever arm (126) and an engaging pin (132) mounted on side tab (124). Operator's handle (134) controls cam (136) through shaft (138). As shown in FIG. 7, the operator's handle (134) is in the open position so the disk (2) in envelope (3) may be removed or inserted into the disk drive. Spring (118) is holding plate (25), and thus spindle cap (62), away from the envelope (3). Pin (132) is holding lever arm (126) away from base plate (92); lever arm (126) is contacting cam (136) at arm location (144). There is a corresponding side tab, lever arm, pins, and cam located on the outside of the opposite side wall (74, FIG. 5) as well. Thus, there is no tendency for plate (25) to tip towards lever (126), i.e., to roll along the axis defined by nut (98) and shaft (20). There will be, however, a tendency for plate (25) to bend so that the axis of shaft (20) will not be perfectly parallel to the axis of spindle shaft (118) and plug shaft (56).

As the operator's handle (134) is rotated counter-clockwise to center and clamp the disk in preparation for spinning the disk, cam tip (140) contacts lever arm (126) at arm location (142). As the cam (136) continues to rotate, cam tip (140) moves towards arm location (144), depressing lever arm (126) towards base plate (92) in the process. This motion of lever arm (126) is coupled to plate (25) via pin (132) and side tab (124). The resulting action of the rest of the mechanism has been described above.

Figure 8:
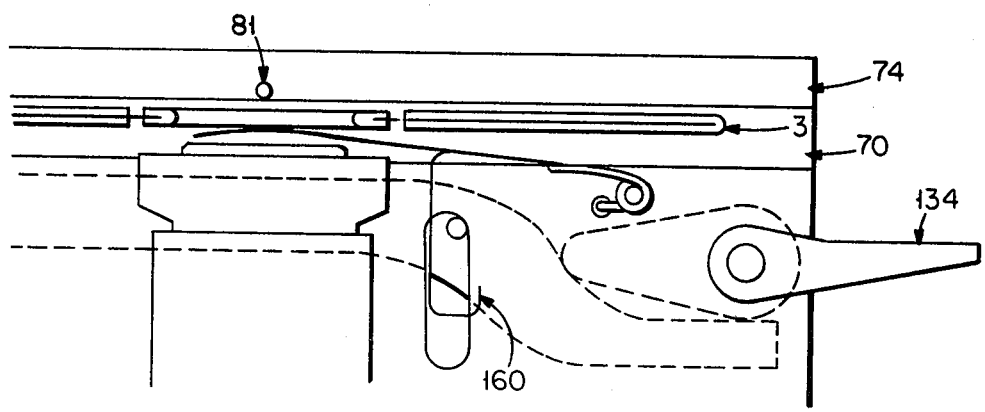
FIG. 8 is a side view of an alternate embodiment of the skid plate shown in FIGS. 4 and 5; and, FIG. 9 is a top view of the skid plate shown in FIG. 8.
Figure 9:
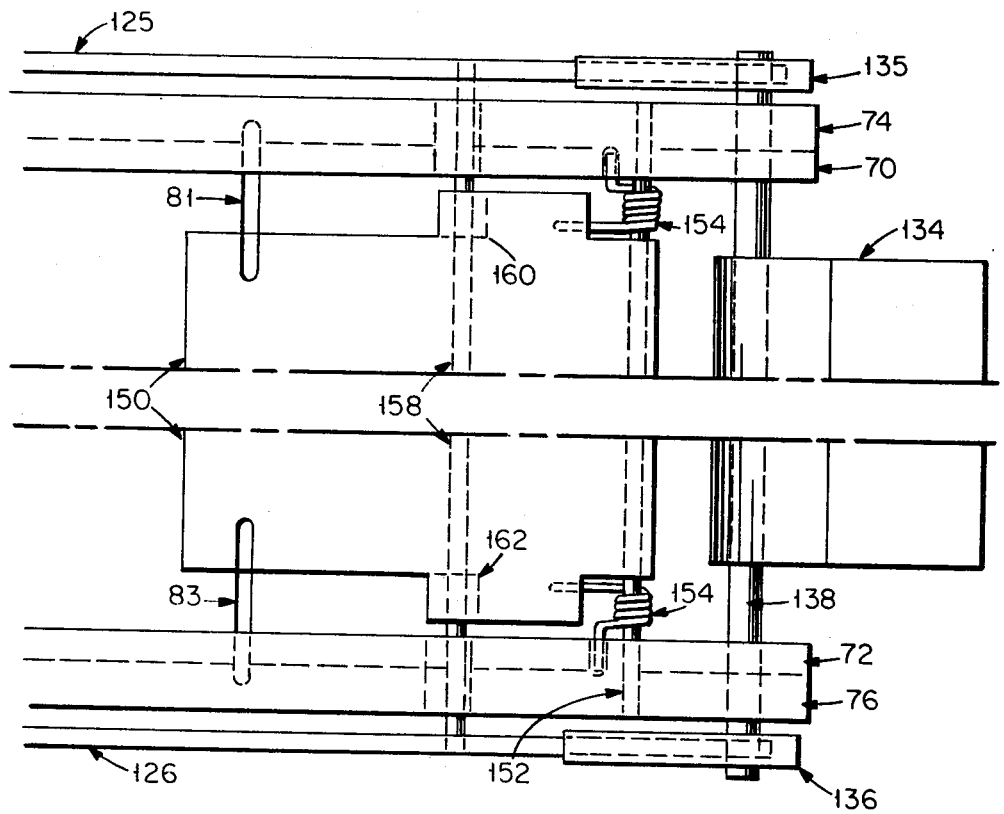

Referring now to FIG. 8 and FIG. 9, another embodiment of the invention will be described. Skid plate (150, FIG. 9) is pivoted on rod (152). Coil springs (154, 156) bias the skid plate (150) against restraining pins (81, 83). The coil springs (154, 156) are tensioned just sufficiently so that the skid plate (150) holds the envelope (3) against the top of channels (70, 72); this minimizes the wear on envelope (3) due to repeated insertions. Springs (154, 156) serve the additional function of centering the skid plate (150) so that its edges do not scrape against side walls (74, 76). Skid plate (150) is pulled away from envelope (3) through use of rod (158) that connects lever arm (126) to lever arm (125) and skid plate hooks (160, 162). As operator's handle (134) is rotated so that lever arms (125, 126) are moved towards base plate (92), rod (158) contacts hooks (160, 162) and thereby pulls the skid plate (150) out of the way.

It should be understood that those skilled in the art can develop other ways of coupling the motion of operator lever (134) to spindle cap (62), spindle plug (54), and to skid plate (78, FIG. 5 or 150, FIG. 9). It should also be understood that those skilled in the art can develop other ways of performing the function of the skid plate (78 or 150).

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A disk centering-and-clamping apparatus comprising:

a spindle (8; 40; 52), said spindle being shaped so as to receive onto said spindle a disk having a center hole therein, said spindle including:

a spindle shaft;

said spindle being capable of rotary motion around an axis of rotation (10), means for centering said disk over said spindle such that said center hole is acurately centered on said spindle, said centering means including means (2) for orienting said disk othogonal to said axis of rotation;

said means for centering said disk on said spindle further including:

a seating surface (6) on said spindle perpendicular to said axis of rotation of said spindle, and, a cylindrical alignment surface (12) coaxial with said axis of rotation (10) of said spindle, said cylindrical surface (12) being terminated at one end by said seating surface and at an opposite end by a conical surface (14; 42; 60) which tapers towards said axis of rotation (10);

means for clamping said disk on said spindle such that as said spindle is rotated, said disk rotates with said spindle;

said means for clamping said disk on said spindle further including:

a spindle cap (24; 44; 62), said spindle cap (24; 44; 62) having a spindle cap shaft (20) such that said spindle cap is capable of rotary motion around said axis of rotation (10), said spindle cap (24; 44; 62) positioned with respect to said spindle (8; 40; 52) such that said spindle cap may be either engaged with or disengaged from said spindle, said spindle cap (24) having a clamping surface (26) perpendicular to said axis of rotation (10) for clamping a disk to said seating surface (6) of said spindle (8; 40; 52) when said spindle cap is engaged with said spindle;

said spindle cap having a conical tip (34; 46);

said spindle (8; 40; 52) being provided with an alignment hole (36; 48) in said conical surface (14; 60; 42) of said spindle (8; 40; 52), said alignment hole being adapted to receive said conical tip (34; 46);

moving means for, selectively, (1) urging said spindle cap and said spindle into disengagement to thereby permit placement of said disk on said spindle, and, (2) urging said spindle cap and said spindle into engagement with each other to thereby engage said clamping surface (26) on said spindle cap (8; 40; 52) with said seating surface (6) on said spindle to thereby clamp said disk between said clamping surface and said seating surface.

2. The combination in accordance with claim 1 wherein said spindle (52) includes:
   a receiving hole (48) in the center of said spindle;
   a spindle shaft;
   a plug (54) located in said receiving hole (48),
   said plug being connected to a plug-shaft (56) coaxial with said spindle (52), such that said plug can be extended, at least partially, out of said receiving hole, and retracted, at least partially, into said receiving hole,
   said plug having a conical surface (60) coaxial with said plug shaft (56) for engaging the center hole of said disk in cooperative relationship with said conical surface (42) on said spindle (52), when said plug is extended out of said receiving hole; and,
   plug-moving means (112) attached to said plug shaft (56) for pulling said plug down into said receiving hole in said spindle, and for pushing said plug up at least partially out of said receiving hole towards said spindle cap (62).

3. The combination in accordance with claims 1 or 2 wherein the combined height of said cylindrical surface (12) and said conical surface (42) above said seating surface (6) on said spindle is approximately equal to the thickness of the disk being clamped.

4. The combination in accordance with claim 2 further comprising:
   bearing means (22); and,
   means (20) for attaching said spindle cap through said bearing means to said moving means (25).

5. The combination in accordance with claim 4 further comprising:
   an operator's handle (134 and 126) movable to a first position and to a second position,
   said operator's handle being connected to said moving means (25)
   said plug-moving means (112) being connected to said moving means (25) such that:
   when said operator's handle is in said first position, said spindle cap (62) is disengaged from said spindle and said plug is down in said receiving hole (48), so that a disk may be inserted between said spindle cap and said spindle, and,
   when said operator's handle is in said second position, said spindle cap is engaged with said spindle and said plug is extended out of said receiving hole (48).

6. The combination in accordance with claims 4 or 5 wherein
   said plug is provided with a first surface parallel to said seating surface on said spindle, and,
   said spindle cap is provided with a second surface parallel to said clamping surface on said spindle cap, said second surface located with respect to said first surface so as to be able to engage with said parallel first surface on said plug,
   such that as said spindle cap and said plug are moved toward each other, said second-parallel surface of said spindle cap engages said first surface on said plug, thereby aligning said spindle-cap-clamping surface with said spindle-seating surface as said plug rises out of said spindle recess and said spindle cap lowers onto the spindle to clamp the disk between said spindle-cap-clamping surface and said spindle-seating surface.

7. The combination in accordance with claims 1, 2, 4 or 5 further comprising:
   skid-plate means (78, 150) adapted to provide a surface upon which a disk can rest when inserted between said spindle and said spindle cap;
   said skid-plate means (78, 150) coupled to said first-moving means such that,
   as said first-moving means urges said spindle cap and said spindle to disengage said spindle cap from said spindle, said skid plate is moved into a position between said spindle and said spindle cap to thereby permit placement of said disk on said skid plate, and,
   as said first-moving means urges said spindle cap and said spindle into engagement with each other, said skid plate is removed from said position between said spindle and said spindle cap to thereby allow said disk to be lowered onto said spindle.

8. The combination in accordance with claim 7 wherein said skid-plate means (78, 150) is further adapted to hold said disk against said clamping surface of said spindle cap, thereby holding said disk substantially parallel to said seating surface of said spindle, thereby ensuring that said centering hole of said disk does not bind up with said cylindrical-alignment surface of said spindle, as said first-moving means urges said spindle cap and said spindle into engagement with each other.

9. The combination in accordance with claims 1, 2, 4, or 5 wherein said moving means further comprises:
   a top plate (25),
   said spindle cap being rotatably-mounted on said top plate (25);
   said top plate (25) being parallel to said clamping surface (26) of said spindle cap,
   a base plate (92);
   said spindle (8; 52) being rotatably-mounted on said base plate such that said seating surface (6) of said spindle is parallel to said top plate (25),
   a relay rod (96) positioned perpendicularly between said top plate (25) and said base plate (92);
   a first one of said plates being rigidly joined to one end of said relay rod,
   said relay rod (96) being slidably-mounted on a second one of said plates, so that said top plate (25) with spindle cap mounted thereon and said base plate (92) with spindle mounted thereon are movable toward and away from each other,
   whereby as said plates are moved with respect to each other, said spindle-cap-clamping surface and said spindle-seating surface are maintained substantially parallel to each other.

10. The combination in accordance with claim 9 wherein
   said plug-moving means further comprises:
   a lever (112) located on said base plate (92);
   said lever being pivotally-mounted such that said lever is free to rotate around a pivot (114) which is attached to said base plate,
   said lever being slidably-connected (116) to said plug shaft so as to prevent imparting side loads to said plug shaft and slidably-connected (110) to said relay rod (96) so as to prevent imparting side loads to said relay rod, said pivot (114) being located closer to said relay rod than to said plug shaft so that a distinct mechanical advantage exists at said relay rod, a first spring (58) located between said spindle plug and said spindle, tensioned so as to force said spindle plug towards said spindle cap, whereby said sliding connections of said lever to said relay rod and to said plug shaft are held taut in the axial direction of said relay rod and said plug shaft when said spindle cap is disengaged from said spindle, and, a second spring (118) located with respect to said top plate (25) and said plate (92) tensioned so as to force said top plate (25) away from said base plate, said sliding connections (110, 116) to said relay rod and to said plug shaft being such that said lever falls loose in the axial direction of said relay rod and said plug shaft when said spindle cap and said plug are in contact with each other.

11. The combination in accordance with claim 9 wherein said operator's handle (134) comprises a handle shaft (138) connected to said operator's handle such that as said handle is moved, said shaft rotates, said handle shaft lying in a plane parallel to said base plate (92), the axis of rotation of said handle shaft being perpendicular to said relay rod (96), a first cam (135) connected to one end of said handle shaft;

a second cam (136) connected to that end of said handle shaft which is opposite to said one end of said handle shaft;

such that said cams (135, 136) are rotated by said handle shaft as said operator's handle is moved, a first-lever arm (125) which engages said first cam;

a second-lever (126) arm which engages said second cam;

said first-lever arm being secured at one point by a first pivot-pin attached to said first plate (92) and slidably-engaging at another point by another pin attached to said second plate (25);

said second-lever arm being similarly secured at one point by a second pivot-pin (128) attached to said first plate (92) and slidably-engaging at another point by a second other pin (132) attached to said second plate (25);

whereby rotary motion of said handle shaft (138) is translated into rotary motion of said first (135) and second (136) cams, said cams causing motion of said first- and second-lever arms (125, 126) about said first- and second-pivot pins, respectively, said first-lever arm causing said second plate (25) to move toward or away from said first plate (92) through coaction with said another pin and said second-lever arm causing said second plate to move toward or away from said first plate through coaction with said second other pin.

12. The combination in accordance with claim 7 wherein said first means (78) comprises a leaf spring, said leaf spring located substantially in the same plane as said seating surface (6) of said spindle, beam means (152);

said leaf spring (150) being constrained at one edge by said beam means, said leaf spring extending from said beam means to and around said spindle, said leaf spring being biased (154, 156) in a direction away from said spindle-seating surface towards said spindle cap, to thereby exert a force sufficient to keep a disk inserted in between said spindle and said spindle cap away from said spindle-seating surface, said leaf spring being so shaped that as said spindle cap is lowered, upward forces exerted by said leaf spring on said disk are symmetrical around said spindle cap so that there are minimal torques generated in said spindle cap as said spindle cap pushes said disk against said leaf spring, and, means (84, 86, 80, 82; 84, 86, 160, 162) for moving said leaf spring out of contact with said disk when said disk is clamped between said seating surface on said spindle and said clamping surface on said spindle cap.

13. The combination in accordance with claim 12 wherein said leaf spring includes a tab (80) extending from said leaf spring, and, said means for moving said leaf spring out of contact with said disk when said disk is clamped between said seating surface on said spindle and said clamping surface on said spindle cap comprises a post (84) extending from said top plate (25) that impinges on said tab when said top plate (25) is moved toward said base plate (92).

14. The combination in accordance with claim 12 wherein said leaf-spring plate includes a hook (162) extending from said leaf-spring plate, and, said means for moving said leaf spring out of contact with said disk when said disk is clamped between said seating surface on said spindle and said clamping surface on said spindle cap comprises means (132) extending from one of said lever arms that engages said hook when said lever arm moves in such a direction as to cause said top plate to move toward said base plate.

15. The combination in accordance with claim 7 wherein said skid plate means comprises a spring-loaded plate (150), said spring-loaded plate located substantially in the same plane as said seating surface (6) of said spindle, rod means (152);

said spring-loaded plate being constrained at one edge by said rod means (152), said spring-loaded plate extending from said rod means (152) to and around said spindle, means (154, 156) for tensioning said spring-loaded plate in a direction away from said spindle-seating surface towards said spindle cap, to thereby exert a force sufficient to keep a disk inserted in between said spindle and said spindle cap away from said spindle-seating surface, said spring-loaded plate being so shaped that as said spindle cap is lowered, upward forces exerted by said spring-loaded plate on said disk are symmetrical around said spindle cap so that there are minimal torques generated in said spindle cap as said spindle cap pushes said disk against said spring-loaded plate, and, means (158, 160, 162) for moving said spring-loaded plate out of contact with said disk when said disk is clamped between said seating surface on said spindle and said clamping surface on said spindle cap.

16. The combination in accordance with claim 15 wherein
   said spring-loaded plate includes a tab (82) extending from said spring-loaded plate, and,
   said means for moving said spring-loaded plate out of contact with said disk when said disk is clamped between said seating surface on said spindle and said clamping surface on said spindle cap comprises a post (84) extending from said top plate that impinges on said tab (82) when said top plate (25) is moved toward said base plate (92).

17. The combination in accordance with claim 15 wherein
   said spring-loaded plate includes a hook (160) extending from said spring-loaded plate, and,
   said means for moving said spring-loaded plate out of contact with said disk when said disk is clamped between said seating surface on said spindle and said clamping surface on said spindle cap comprises means (158) extending from one of said lever arms that engages said hook when said lever arm moves in such a direction as to cause said top plate (25) to move toward said base plate (92).

* * * * *